Oct. 5, 1954 W. H. BENDALL 2,690,678
WEDGE DRIVE CHAIN
Filed Sept. 3, 1948
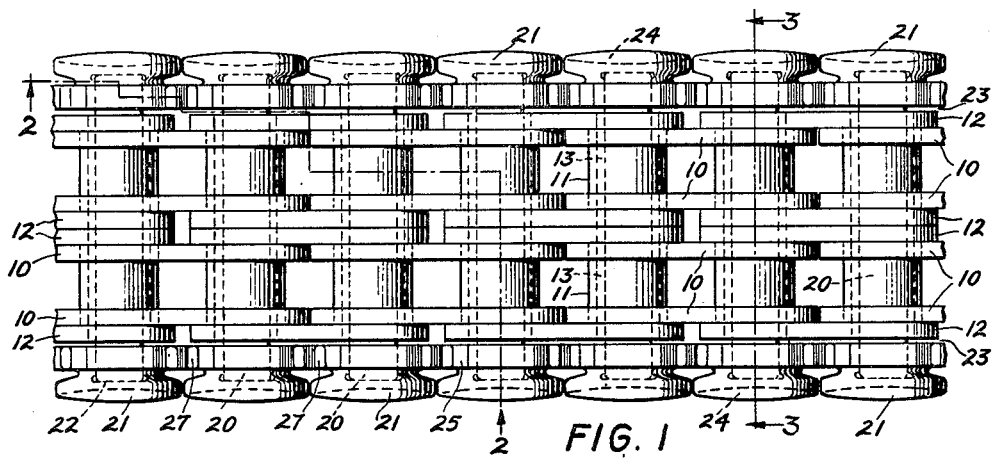
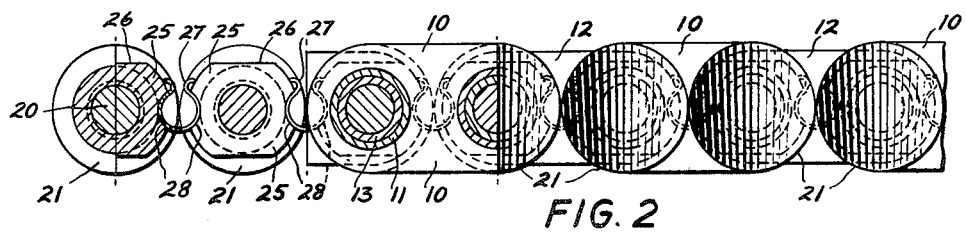
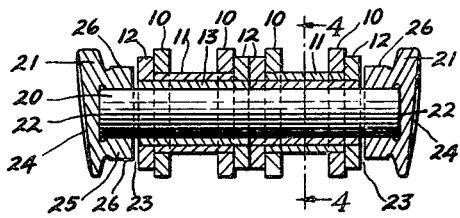
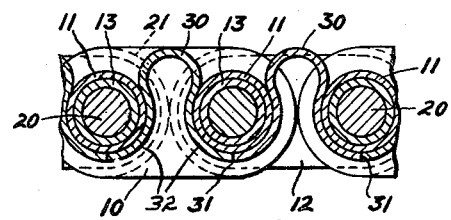
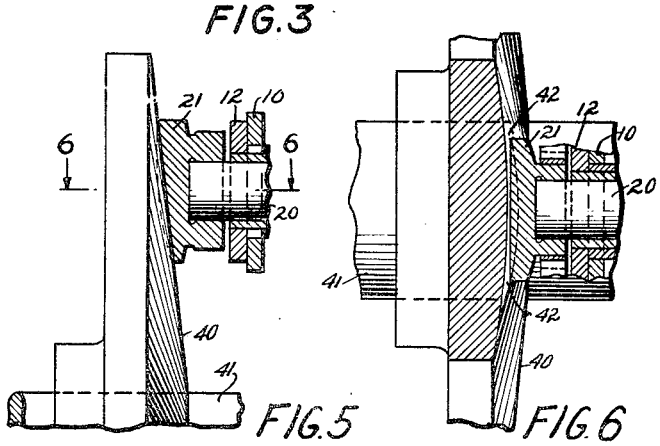
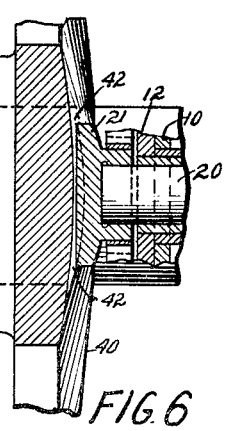
INVENTOR.
Wilfrid H Bendall Patented Oct. 5, 1954

2,690,678

UNITED STATES PATENT OFFICE 2,690,678

WEDGE DRIVE CHAIN

Wilfrid H. Bendall, New York, N. Y.

Application September 3, 1948, Serial No. 47,609

22 Claims. (Cl. 74—245)

This invention relates generally to improvements in power transmission chains and more particularly to chains adapted for wedged driving engagement with V-pulleys of both fixed and variable pitch-diameter.

The increasing scope for this method of transmitting power calls for greater capacity and operating efficiency than can apparently be achieved with chains hitherto proposed for this purpose. As is well known, the pivoted link chains commonly employed for power transmission purposes may be operated with pivot bearing pressures of 6,000 pounds per square inch or more under suitable conditions. Their effective utilization for the present purpose thus requires that any wedge engagement means applied to them enable transmission of the full working load permitted by this high bearing capacity. This has not been accomplished in practice, however, for the following reasons.

The lack of an efficient and durable wedge engagement means has been one of the principal obstacles. Wedge engagement surfaces obtained by attaching such wedge elements as hardened balls and rollers, disclosed in the prior art, result in externally tangent and thus relatively limited metal-to-metal contact areas which are easily damaged by overloads and slip. This is acknowledged to be a common difficulty of the "friction drives" constituted by these devices and has consistently restricted them to low horsepower transmission applications.

Their power transmission capacity is further restricted by the destructive engagement impact imparted to the wedge contact by the characteristic pivoted link action at and above a relatively low operating speed for each size of chain.

Alternative proposals to affix pads of relatively compressible high-friction material to the chain are subject to the supplementary disadvantage that the bearing capacity of such materials usually is relatively low. The principal obstacle to effective use of these materials for this purpose, however, appears to be that of devising a simple and efficient method of mounting such wedge members on the link chain structure.

A further shortcoming of most prior proposals of this nature arises from the location of the wedge members between the link pivot centers. This results in an eccentric load on the wedge elements as the line of chain pull departs from a line through the drive strand pivot centers as each wedge member engages the drive pulleys.

It is consequently a major object of this invention to provide a more efficient and durable wedge drive chain. A chain providing substantially greater power transmitting capacity for a given weight, bulk and cost, over a wider operating speed range, than achieved heretofore. Another object is to provide a simple and economical method of adapting the standardized roller and inverted tooth power transmission chains for efficient wedged driving engagement with V-pulleys. Further objects are, to provide wedge members conveniently adapted for attachment to such chains and to extend the practical operating speed range of chains modified for wedge driving, as described herein, by providing chain impact reducing means. A specific additional object is to provide chain wedge pulley engagement means which permit effective use of a lubricating oil film to carry the wedge engagement pressure without metal-to-metal contact.

These and other objects and advantages of this invention will be apparent from the following description and accompanying drawings in which, Figure 1 is a plan view of a typical roller type chain construction embodying the wedge drive feature of this invention.

Figure 2 is a side elevational view of the chain shown in Figure 1 with a sectional view on the line 2—2 of Figure 1.

Figure 3 is a transverse sectional view of the chain taken on the line 3—3 of Figure 1.

Figure 4 is a sectioned side elevational view showing impact absorbing spring members attached to the chain, as they would appear on line 4—4 of Figure 3.

Figure 5 is a fragmentary, partly sectioned end elevational view showing a chain wedge member engaging one face of a typical V-pulley structure.

Figure 6 is a fragmentary sectional plan view on the line 6—6 of Figure 5.

From reference to Figures 1 and 3 it will be apparent that this invention is shown in these figures as embodied in a so-called "multiple-strand" roller type chain, but it is to be understood that either a single strand or any convenient plurality thereof may be employed to provide any required chain capacity. Inner link plate members 10, are press fitted to each end of outer bushings 11, and outer link plate members 12, are press fitted to each end of hollow inner bushings 13, pivotally concentric with the outer bushings. Since the hollow inner bushings 13 extend to the outer surface of link plate members 12 they may, in the case of a multiple-strand chain, extend in a single length if desired. The concentric bushing members are assembled with a running fit on each other and thus provide the required bearing conditions for the link pivot motion when engaging a drive wheel.

Since both the inner and outer link plate assemblies are provided with bushings they comprise, when pivotally connected, self-contained chain drive strands with hollow pivot centers. This constitutes the principal modification of the roller type chain for the present purpose. It adapts it to receive the co-pivotal pin members 20, which are inserted therein with a free fit and with their ends extending transversely beyond the outermost link plate members on each side of the chain. They are thus utilized to hold multiple strands in alignment but their primary purpose is to carry wedge drive engagement members 21, at each end thereof.

The pin members have flat ends and the wedge members are provided with a flat-ended hole 22, in hub portions 25, within which the pin ends seat with a secure interference fit. Pressure applied to the pulley engagement face 24, of the wedge members is thus taken axially by the pin, as a supporting column. The pin length is proportioned to ensure axial clearance spaces 23, 23 between the wedge members and adjacent link plate surfaces. These clearances, and the solid seating of the pin ends, are provided to preclude any possibility of cramping the chain strands when the wedge members are in driving engagement with a V-pulley. The clearances also facilitate the entry of lubricating oil to the bushings, between adjoining link plate and wedge surfaces.

The wedge members 21, are conveniently made circular in general outline, as shown, but may have any other preferred outline, such as trapezoidal or square. The wedge engagement faces 24, preferably are shaped as segments of an internal circular cone, at a slightly larger radius than the maximum working radius of the conical pulley surface they are required to engage.

The coacting conical pulley surface will thus be internally tangent to the wedge engagement face and the resulting working contact will be centered substantially on the line of tangency between these members. This is illustrated in Figs. 5 and 6, where a wedge member 21, is shown engaging one side of a typical conical V-pulley 40, mounted on a drive shaft 41.

It will be seen that such wedge members, required to engage a conical pulley surface over a variable range of drive radii, will have their maximum working contact at the maximum designed drive radius only. But even at lesser drive radii the contact area achieved with the internally tangential mating surfaces described, is still considerably greater than is obtainable with the usual tangential, or externally tangential plane and cylindrical, mating surfaces of wedge members of the prior art.

As shown most clearly in Fig. 6 the wedge drive contact embodied in this invention is generally characterized by a gradual convergence of the adjacent surfaces of the wedge and pulley members as they approach the contact area, resulting in wedge-shaped clearance spaces 42, 42, on each side of the contact area and converging towards it.

Such converging, internally tangential mating surfaces are further highly advantageous in the present connection in that they provide the essential condition for effectively utilizing an oil wedge film to support the wedge engagement pressure without metal-to-metal contact, as will be noted in more detail hereafter.

Initial alignment of the wedge members when mounting them on the chain and their subsequent alignment relative to each other under operating conditions, are two important features of this invention which are specifically provided for as described in the following.

It will be observed that the body of the wedge member, extending back from the working face, takes the general form of a flanged hub portion 25, for receiving the ends of the pin members. This flange is partly cut away to provide parallel flat surfaces 26, 26 substantially at right angles to a radial line through the center of the wedge member at its normal engagement position. This enables precise alignment of the wedge members at opposite ends of each pin as well as adjoining wedge members, by laying or clamping a straight-edged bar against the flat areas of one or more adjacent wedge members when assembling them on the chain.

Consideration of the required action of opposed internally conical wedge members engaging opposed conical pulley faces will show that relatively rigid conical faced wedge members cannot make a purely tangential engagement entry and cannot be rotationally restrained, relative to the chain link members, without risk of jamming in an inoperative position. It will already be evident that the present method of mounting them on the chain leaves them axially free to rotate through any required angular position within the operating design limits. Their necessarily controlled freedom to do this is ensured by the provision of spring members 27 engaging semi-circular recesses 28 in adjoining hub portions 25 in the line of the chain pivot centers and maintaining them in resilient interconnecting contact with each other. As shown, these springs bridge the small gap between adjacent hub portions and provide the desirably light but positive restraint against random rotation of the pin and wedge assemblies, while still leaving them free to rotate through the small alignment angle required for correct engagement seating. It will be apparent that any convenient form of spring member may be used as described for resiliently interconnecting the wedge members, and that such resilient interconnection may alternatively be realized by making the wedge members themselves of relatively resilient material and arranging them in direct contact with each other at their adjacent side portions.

This controlled but kinematically flexible mounting of the chain wedge members, in permitting their independent rotation relative to each other and to the chain link structure about the link pivot centers, is of particular advantage in enabling the use of such internally tangential wedge members as described herein. An equally important advantage resides in the resulting ability to use a mechanically simple, solidly unified wedge and pin assembly coaxial with the link pivot centers, as shown, since this ensures efficient support of the wedge axial pressure and also ensures that the line of chain pull throughout each link engagement period always passes substantially through the center of the wedge contact area and thus cannot impose an eccentric load on the latter.

It has been stated above that the ends of the pin members seat within the wedge hub portions with a "secure interference fit." It will be understood that this simple procedure, utilizing a moderate press fit, is entirely adequate for retention of the wedge members on a chain when it is considered that in operation the wedge members are subjected to almost continuous axial seating pressure against the ends of the pin members. This method of attachment presents the further advantage of facilitating removal and replacement of the wedge members when dismantling or servicing a drive installation.

As already stated, one of the major objects of this invention is to provide a drive chain of the type described with greater power transmitting capacity over a wider operating speed range than heretofore achieved. Experience with pivoted link power transmission chains has established the fact that they soon reach a limiting speed of operation beyond which the engagement contact assumes the proportions of a destructive impact, which is an inherent operating characteristic of the pivoted link mechanism. In fact, this limiting speed is reached long before the maximum economic power transmitting capacity of the chain, in terms of tensile strength and allowable bearing load, can be effectively employed.

This condition is tacitly accepted as a load limiting factor by the chain industry, since there is, as yet, no recognized method of avoiding it. And while it will not be more objectionable with the wedge drive modification of the present chains than with unmodified chains of this type, at ordinary operating speeds, its elimination at the higher speed is an important supplementary objective of the present invention. A method of spring-loading such chains to reduce destructive impact and considerably extend the allowable speed range has accordingly been devised. The general application of this method is described in detail in a copending United States patent application, Serial No. 788,949, filed November 29, 1947, by the present inventor. Its specific adaptation to a chain of the type described herein is illustrated in Figure 4 and described in the following.

In the latter figure, numeral 30 designates spring members sprung into position in each space between outer bushing members 11 and inner link plate members 10, throughout the chain length. These spring members are formed with an arcuate center portion between oppositely curved end portions 32, which conform closely to the external circumference of the outer bushing members. The maximum diameter of the arcuate center portion is made larger than the clearance space between adjoining bushings on a line through the link pivot centers and the resulting shape and resilient properties of the members are utilized to spring them into this position and ensure their positive retention. It will be noted that the ends of the oppositely curved portions abut at 31, on lines substantially normal to a line through the pivot centers. Hence, when the operating engagement angle of adjacent links brings these points of abutment closer together, the resulting spring deflection and compression result in a radial component of the spring force acting through the pivot centers in opposition to the link motion. With suitably proportioned spring members of the form shown, this force opposes the inertia force of the link mass and thus the destructive impact which otherwise results from the acceleration imparted to it in swinging about the pivot center when engaging a drive wheel. It is then possible to operate the chain at the maximum allowable bearing pressure over the full speed range permitted by the related centrifugal force loading, without objectionable impact. While the impact reducing spring members 30 are shown and described above as comprising short lengths they may alternatively comprise a continuous length if manufacturing convenience permits.

While engagement of these chains with toothed drive sprockets is considered a secondary object of this invention it will be noted that the wedge engagement and spring-loading means described in the foregoing leave the chain entirely free for supplementary driving engagement with sprockets of conventional form, whenever desired. The longitudinal and lateral clearance spaces between adjacent outer bushing members 11 and inner link plate members 10, respectively, in Figs. 1 to 3, can readily be proportioned to accommodate the standard roller chain sprocket tooth, enabling simultaneous drive engagement with a sprocket and a V-pulley. Likewise in Fig. 4, the chain members can similarly be proportioned to provide the required sprocket tooth engagement clearance spaces between the impact reducing spring members 30.

As already noted, the provision of chain wedge engagement means utilizing internally tangential, conical mating surfaces conveys the novel and highly advantageous feature of wedge driving engagement without metal-to-metal contact. Comparatively recent engineering observation of the load-carrying capacity of a lubricating film has estabilshed the fact that it cannot ordinarily be instantaneously squeezed out from between approaching parallel, or nearly parallel, bearing surfaces. If the load applied to the film is of relatively short duration the lubricant's resistance to extrusion permits the bearing surfaces to carry remarkably high loads without actual contact. Further, if the load is periodically relieved and the working conditions permit complete renewal of the film the load may be repeatedly applied.

The foregoing conditions for effective use of a lubricating oil film to carry a load are precisely those embodied in the chains described and illustrated in this specification, when utilized for power transmission with V-pulleys of suitable construction. The internally tangential, conical mating surfaces provide an appreciable contact area for the lubricating film, which can thus be utilized as a hydrostatic cushion for the chain wedge engagement and driving pressure during the brief period of individual wedge engagement at normal working speeds. Subsequent unloaded passage of the wedge elements from a driving to a driven wheel provides the required period for complete renewal of the lubricating film on the coacting surfaces.

The oil collecting property of the wedge members shown and described herein also enables a chain provided with such members to function as a fluid film clutch element by safely accommodating initial slip between the chain and drive wheel surfaces at starting speeds and permitting gradually increasing wedge pressure as the drive speed increases up to the maximum required to carry the load. The evident ability of the converging surface of the wedge members to generate an oil wedge between themselves and the pulley surface under such conditions provides effective insurance against overload slip damage at the engagement surfaces, since the wedge film thickness is instantly built up when slip occurs. A correlated advantage is that wedge engagement members of this form permit these chains to function as effective torsional vibration and shock damping mediums between the driving and driven members of machines.

It is to be understood that the forms of this invention herewith shown and described are to be taken as preferred examples of the same. The general shape and arrangement of the link, wedge and spring members may obviously be varied without affecting the principle of operation and such changes may evidently be resorted to without departing from the scope of the appended claims.

Having thus described the invention, I claim:

1. A drive chain comprising pivotally connected link members and co-pivotal pin members carrying wedge members with oppositely inclined working faces for wedged driving engagement with conical pulley faces and having spring members adapted to bear on the link members to provide an opposing force to the characteristic pivoted link inertia force when engaging a drive pulley or wheel.

2. A drive chain comprising pivotally connected sprocket engaging link members and co-pivotal pin members carrying wedge members for wedged driving engagement with V-pulleys and having spring members adapted to bear on the link members to provide an opposing force to the destructive pivoted link inertia force when engaging drive pulleys and sprocket wheels.

3. A drive chain comprising pivotally connected link members and axially pivoted pairs of wedge members, said wedge members being mounted on pin members coaxial with the link pivot centers and having working faces shaped to provide internally tangential driving engagement with conical pulley faces and having wedge alignment spring members extending between adjacent wedge members, for controlling the engagement angle of said wedge members.

4. A drive chain comprising pivoted link members with copivotal pin members extending through the pivot centers, wedge members mounted coaxial with said pin members and shaped to provide internally tangential wedge drive engagement with conical pulley faces and spring members yieldably controlling the internally tangential engagement of said wedge members.

5. A drive chain comprising pivoted link members and copivotal pin members carrying wedge drive members at each end thereof, said pin and wedge members being axially free for rotation independently of said link members and having spring members extending between and bearing on adjacent wedge members for controlling said rotation.

6. A drive chain comprising pivotally connected link members having wedge members attached thereto for wedged driving engagement with V-pulleys and spring members arranged to bear on said link members to oppose the characteristic pivoted link impact when engaging said V-pulleys.

7. A wedge drive chain adapted to engage conical pulleys of variable drive pitch diameter comprising pivotally connected link members having independently rotatable copivotal pin members with ends extending outside the pivotal connection carrying wedge members, each of said wedge members having a working face comprising a segment of an internally conical surface of slightly larger radius than the maximum conical pulley drive radius it is required to engage.

8. A wedge drive chain comprising pivoted link members interconnected by hollow pivot members, copivotal pin members passing through said hollow pivot members and extending outside the pivotal connection, a wedge drive member mounted on each copivotal extension and resilient means flexibly interconnecting said wedge members.

9. The wedge drive chain of claim 8, said pin members being free for rotation within said hollow pivot members and said resilient means controlling said rotation.

10. The wedge drive chain of claim 8, said chain further comprising separable parallel strands of pivoted link members held in transverse alignment by said pin members.

11. The wedge drive chain of claim 8, said wedge members being shaped for wedged driving engagement with conical pulleys and said pivot members being adapted for sprocket tooth engagement.

12. A wedge chain drive comprising conical pulley members and a drive chain having wedge members attached thereto for wedged fluid film driving engagement with said pulley members, each of said wedge members having a conical wedge working face of larger mean radius than the maximum conical working face radius of said pulley members, said larger mean radius providing converging wedge and pulley coacting surfaces for collecting and wedging a load supporting film.

13. The chain drive of claim 12, said chain further comprising link pivot members adapted for engaging a drive sprocket.

14. The chain drive of claim 12, said chain further comprising pivoted link members and copivotal wedge members and said wedge members having spring members extending between adjacent wedge members and maintaining them in resilient interconnecting contact with each other.

15. A wedge drive chain wedge member comprising a flanged working face portion for engaging conical pulleys and an annular hub portion extending back from said face portion for attaching said wedge member to a chain.

16. The wedge member of claim 15, said working face portion further comprising a segment of an internally conical engagement surface.

17. A wedge drive chain wedge member having an integral attaching hub and working face, said working face being inclined with respect to said hub and said hub having side portions adapted for resilient engagement with side portions of adjacent wedge members.

18. A wedge drive chain wedge member comprising an inclined working face portion for engaging conical pulleys and an annular attaching hub portion integral therewith and extending back from said face portion for attaching said wedge member to a chain pin.

19. A wedge drive chain comprising pivotally connected link members having independently rotatable copivotal pin members with ends extending outside the pivotal connection carrying wedge members thereon, each of said wedge members having an inclined working face portion and an annular hub portion extending back from said face portion for engaging an end of a pin member.

20. A wedge drive chain comprising a plurality of pivotally connected strands of link members having independently rotatable copivotal pin members aligning said strands and having pin end portions extending outside the pivotal connection carrying wedge members thereon, each of said wedge members having an inclined working face portion and an annular hub portion extending back from said face portion for engaging an end of a pin member.

21. A wedge drive chain comprising pivotally connected sprocket engaging members and independently rotatable copivotal pin members with ends extending outside the pivotal connection carrying wedge members thereon, each of said wedge members having an inclined working face portion and an annular hub portion extending back from said face portion for engaging an end of a pin member.

22. A drive chain comprising pivotally connected link members and copivotal pin members carrying wedge members, said pin members being independently rotatable within said pivotal connection and said wedge members having internally conical working faces.

References Cited in the file of this patent

UNITED STATES PATENTS

| Number | Name | Date |
|---|---|---|
| 702,874 | Howard | June 17, 1902 |
| 803,810 | Cutter | Nov. 7, 1905 |
| 1,691,871 | Reeves | Nov. 13, 1928 |
| 2,279,134 | Dalrymple | Apr. 7, 1942 |

FOREIGN PATENTS

| Number | Country | Date |
|---|---|---|
| 312,611 | Germany | May 31, 1919 |